(12) United States Patent
Klemm

(10) Patent No.: US 6,993,591 B1
(45) Date of Patent: Jan. 31, 2006

(54) METHOD AND APPARATUS FOR PREFETCHING INTERNET RESOURCES BASED ON ESTIMATED ROUND TRIP TIME

(75) Inventor: Reinhard Klemm, North Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 577 days.

(21) Appl. No.: 09/164,509

(22) Filed: Sep. 30, 1998

(51) Int. Cl.
*G06F 15/16* (2006.01)

(52) U.S. Cl. ............ 709/232; 709/219; 709/223; 707/2; 707/10

(58) Field of Classification Search .......... 709/106, 709/202, 219, 213, 214, 215, 216, 223, 235, 709/232, 224; 707/2, 10
See application file for complete search history.

(56) References Cited

U.S. PATENT DOCUMENTS

| | | | |
|---|---|---|---|
| 5,864,863 A * | 1/1999 | Burrows | |
| 5,918,002 A * | 6/1999 | Klemets et al. | |
| 5,918,017 A * | 6/1999 | Attanasio et al. | 709/224 |
| 5,935,210 A * | 8/1999 | Strak | |
| 5,961,603 A * | 10/1999 | Kunkel et al. | |
| 6,006,265 A * | 12/1999 | Rangan et al. | |
| 6,012,096 A * | 1/2000 | Link et al. | 709/233 |
| 6,021,439 A * | 2/2000 | Turek et al. | 709/224 |
| 6,026,452 A * | 2/2000 | Pitts | 710/56 |
| 6,029,182 A * | 2/2000 | Nehab et al. | |
| 6,067,565 A * | 5/2000 | Horvitz | 709/223 |
| 6,078,956 A * | 6/2000 | Bryant et al. | 709/224 |
| 6,115,752 A * | 9/2000 | Chauhan | |
| 6,119,235 A * | 9/2000 | Vaid et al. | |
| 6,122,661 A * | 9/2000 | Stedman et al. | |
| 6,134,584 A * | 10/2000 | Chang et al. | 709/219 |
| 6,173,318 B1 * | 1/2001 | Jackson et al. | 709/219 |

(Continued)

OTHER PUBLICATIONS

Venkata N. Padmanabhan and Jeffrey C. Mogul, Using Predictive Prefetching to Improve World Wide Web Latency, Proc. of ACM SIGCOMM '96, (Jul. 1996).

(Continued)

*Primary Examiner*—Andrew Caldwell
*Assistant Examiner*—Stephan Willett

(57) ABSTRACT

A method and apparatus are disclosed for prefetching Internet resources based on the estimated round trip time of the resources. Whenever a user clicks on an embedded hyperlink, the prefetching strategy aims to ensure that the corresponding document has been prefetched or can be fetched very quickly from its origin server. Web access time as perceived by the user is reduced, while also minimizing the network, server and local resource overhead due to prefetching. The estimated round trip time is obtained or approximated for all referenced documents. The "round trip" time or access time of a resource is the time interval between the sending of the first byte of an HTTP request for the resource until the last byte of the server response has arrived at the requesting Web client. Documents with the longest access times are prefetched first and prefetching generally continues until the estimated round trip time falls below a predefined threshold. An HTTP HEAD request may be used to determine the estimated round trip time of a Web resource. The prefetching agent can be configured to prevent prefetching of those documents that are quickly fetchable, dynamically generated or non-HTTP based resources, or those documents whose size exceed a certain limit, to minimize the network, server and local resource overhead due to prefetching. The thresholds applied to the list of documents to be prefetched can be dynamically adjusted by the agent, based on changing network and server conditions.

29 Claims, 5 Drawing Sheets

U.S. PATENT DOCUMENTS

| | | | |
|---|---|---|---|
| 6,178,449 B1 * | 1/2001 | Forman et al. | 709/224 |
| 6,182,113 B1 * | 1/2001 | Narayanaswami | |
| 6,182,125 B1 * | 1/2001 | Borella et al. | |
| 6,182,133 B1 * | 1/2001 | Horvitz | 709/223 |
| 6,185,619 B1 * | 2/2001 | Joffe et al. | |
| 6,191,782 B1 * | 2/2001 | Mori et al. | |
| 6,216,163 B1 * | 3/2001 | Bharali et al. | |
| 6,233,606 B1 * | 5/2001 | Dujari | |
| 6,243,761 B1 * | 6/2001 | Mogul et al. | |
| 6,279,001 B1 * | 8/2001 | DeBettencourt et al. | 707/10 |
| 6,314,463 B1 * | 11/2001 | Abbott et al. | 709/224 |
| 6,324,182 B1 * | 11/2001 | Burns et al. | 370/429 |
| 6,339,750 B1 * | 1/2002 | Hoyer et al. | |
| 6,385,641 B1 * | 5/2002 | Jiang et al. | 709/203 |
| 6,405,252 B1 * | 6/2002 | Gupta et al. | 709/224 |
| 6,411,998 B1 * | 6/2002 | Bryant et al. | 709/224 |
| 2001/0010059 A1 * | 7/2001 | Burman et al. | |
| 2001/0027485 A1 * | 10/2001 | Ogishi et al. | 709/224 |
| 2002/0010761 A1 * | 1/2002 | Carneal et al. | 709/219 |
| 2002/0052942 A1 * | 5/2002 | Swildens et al. | |
| 2002/0120727 A1 * | 8/2002 | Curley et al. | 709/224 |

OTHER PUBLICATIONS

PeakJet 2000, downloaded from www.peak.com/techpeakjet2.html on Sep. 26, 1998.

Peter Scheuermann et al., A Case for Delay-Conscious Caching of Web Documents, Computer Networks and ISDN Systems, 29:997-1005 (1997).

Surf Express Deluxe, promotional brochure Connectix Corporation (Jun. 1998).

Stuart Wachsberg et al., Fast World-Wide Web Browsing Over Low-Bandwidth Links, downloaded from http://ccnga.uwaterloo.ca/-sbwachsb/paper.html on Apr. 21, 1997.

Zheng Wang and Jon Crowcraft, Prefetching in World Wide Web, Proc. of IEEE Global Internet 1996, 28-32 (1996).

WebEarly 98 downloaded from www.webearly.com/us/description.html on Sep. 26, 1998.

Web Latency Reduction: Related Research, downloaded on Apr. 21, 1997 (Feb. 1997).

Ken-ichi Chinen and Suguru Yamaguchi, An Interactive Prefetching Proxy Server for Improvement of WWW Latency, Proc. Inet 1997 (Jun. 1997).

Mark Crovella and Azer Bestavros, Self-Similarity in World Wide Web Traffic: Evidence and Possible Causes, Proc. of the ACM SIGMETRICS Int'l Conf. on Measurement and Modeling of Computer Systems, vol. 24, No. 1 of ACM SIGMETRICS Performance Evaluation Review, 160-69 (1996).

Carlos R. Cuhna and Carlos F.B. Jaccoud, Determining WWW User's Next Access and Its Application to Prefetching, 2d IEEE Symp. on Computers and Communications (1997).

Steven D. Gribble and Eric A. Brewer, System Design Issues for Internet for Internet Middleware Services: Deductions from a Large Client Trace, USENIX Symp. on Internet Technologies and Systems Proc., 207-18 (Dec. 1997).

Kiss Software, downloaded from http://208.197.91.89/html/speedsurfer_product_page.html on Sep. 26, 1998.

Will E. Leland et al., On the Self-Similar Nature of Ethernet Traffic, IEEE/ACM Transactions on Networking, 2:1-15 (1994).

Tong Sau Loon and Vaduvur Bharghavan, Alleviating the Latency and Bandwidth Problems in WWW Browsing, USENIX Symp. on Internet Technologies and Systems Proc., 219-30 (Dec. 1997).

NetAccelerator 2.0 downloaded from www.imisoft.com/netaccelerator on Sep. 26, 1998.

* cited by examiner

METHOD AND APPARATUS FOR PREFETCHING INTERNET RESOURCES BASED ON ESTIMATED ROUND TRIP TIME

FIELD OF THE INVENTION

The present invention relates to Internet prefetching techniques, and more particularly, to a method and apparatus for prefetching Internet resources that reduces resource access times from the user's point of view while minimizing the overhead on network, server and local resources.

BACKGROUND OF THE INVENTION

A number of techniques have been proposed for improving the access time for Internet resources, from the user's point of view. Prefetching strategies, for example, attempt to load documents into a client before the user has actually selected any of these documents-for browsing. When a user selects a hyperlink in a currently viewed document, or identifies a document using a uniform resource locator ("URL"), the addressed document may have already been prefetched and stored on or near the user's machine, thus reducing the document access time observed by the user.

Most commercial client-side online Web prefetching agents, such as those commercially available from International Microcomputer Software, Inc. (IMSI) of San Rafael, Calif., employ a greedy prefetching strategy. Greedy prefetching strategies allow the user to specify some prefetching parameters, such as the amount and kind of resources to be prefetched and the minimum user idle time before initiating prefetching, and then prefetch as many embedded hyperlinks as possible in a Web page that is currently displayed in a browser. Prefetching continues until the user requests a new Web page using the browser or when all hyperlinks and their embedded documents or hyperlinks have been prefetched.

Non-greedy client-side online Web prefetching agents, such as user history-based prefetching strategies, try to anticipate the embedded hyperlinks the user is likely to select. User history-based prefetching strategies make decisions according to prior observed user behavior. The observations may be Web page-specific and applied when a user revisits the same Web page, such as in how many cases the user clicked on a particular embedded hyperlink in a given Web page, or browser-specific, such as by (i) content category, (ii) geography of the server, or (iii) the distribution of hyperlink clicks in different portions of Web pages, for example, where the user is attracted to advertising. For a more detailed discussion of user history-based prefetching strategies, see, for example, Carlos R. Cunha and Carlos F. B. Jaccoud, "Determining WWW User's Next Access and Its Application to Prefetching," Second IEEE Symp. on Computers and Communications (1997), incorporated by reference herein.

Such greedy and user history-based prefetching strategies frequently prefetch Web pages that can be obtained relatively quickly from their respective origin servers anyway. If a Web page can be obtained quickly, prefetching the Web page will lead to only minor access speed improvements, while potentially incurring high network and server overheads as well as unnecessary local resource consumption because the user might never access the prefetched page. User history-based prefetching strategies-attempt to minimize unnecessary prefetching by prefetching only Web pages that are likely to be accessed by the user. However, if the user selects to follow a hyperlink that the prefetching strategy did not anticipate, the user will experience the same access speed as without a prefetching agent. Moreover, the probability of a user history-based strategy selecting a Web page that the user will actually access can be very low when the user browses a large variety of different Web pages or exhibits an otherwise inconsistent browsing behavior.

SUMMARY OF THE INVENTION

Generally, a method and apparatus are disclosed for prefetching Internet resources based on the estimated round trip time for the resources referenced in a currently displayed Web page. The disclosed prefetching strategy aims to ensure that whenever the user clicks on an embedded hyperlink, the corresponding document has been prefetched or, if not, that the document can be fetched very quickly from its origin server. The present invention reduces the Web access time perceived by the user, while also minimizing the network, server and local resource overhead due to prefetching.

The present invention utilizes the estimated round trip time of documents referenced by embedded hyperlinks in a currently viewed document. The estimated round trip time is obtained or approximated for all referenced documents. The "round trip" time or access time of a resource is the time interval between the sending of the first byte of an HTTP request for the resource until the last byte of the server response has arrived at the requesting Web client. Documents with the longest access times are prefetched first and prefetching generally continues until the estimated round trip time falls below a predefined threshold. Thus, if a user clicks on an embedded hyperlink, the referenced document has either been fetched already or, if not, fetching the document from the origin server takes only a short time. Several documents can be prefetched substantially in parallel to speed up the prefetching process.

In one implementation, an HTTP HEAD request is used to determine the estimated round trip time of a Web resource. A HEAD request obtains status information and the size of the requested resource, s, from the origin server. If the server responds to the HEAD request with the document size, s, the prefetching agent computes the estimated round trip time for further processing. If the server responds but fails to specify the document size, the prefetching agent utilizes the recorded average resource size, s, of resources previously received from the server. If the HEAD request does not yield any response from the server, or if the response shows an error code, then the prefetching agent determines that the hyperlinked document is not accessible and can provide an error message immediately once the user clicks on this hyperlink.

According to another aspect of the invention, the prefetching agent can be configured to prevent prefetching of those documents that are quickly fetchable, dynamically generated or non-HTTP based resources, or those documents whose size exceed a certain limit. In this manner, the present invention reduces the Web access time perceived by the user, while also minimizing the network, server and local resource overhead due to prefetching. In one preferred embodiment, the time and size thresholds that are applied to the list of embedded hyperlinks and corresponding estimated round trip times to reduce the number of documents to be prefetched are dynamically adjusted, based on changing network and server conditions.

BRIEF DESCRIPTION OF THE DRAWINGS

FIG. 3 illustrates a sample table from a server statistics database utilized by the prefetching agent of FIG. 1;

DETAILED DESCRIPTION

Figure 1:
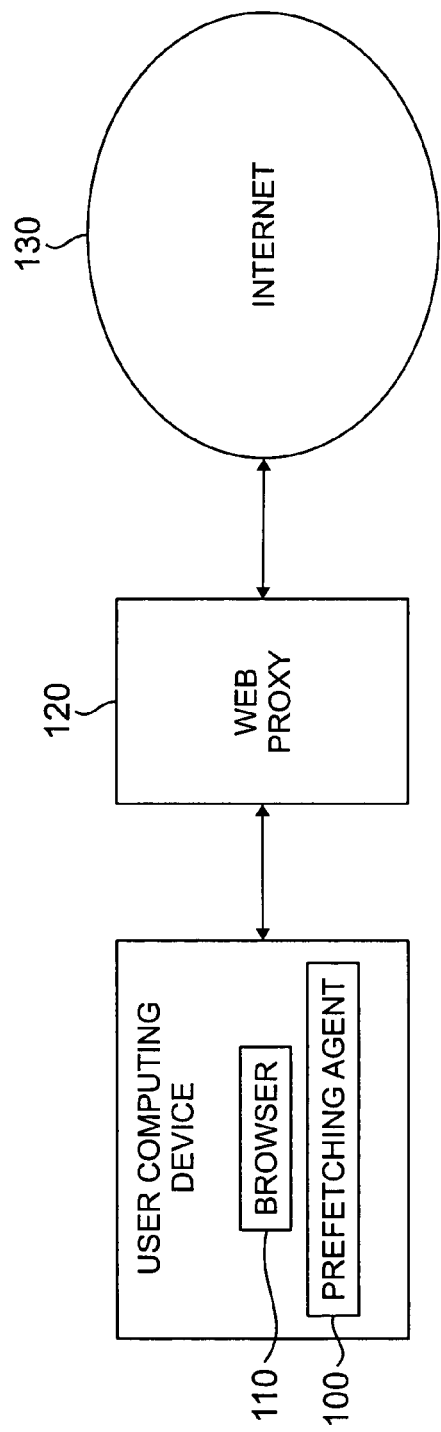
FIG. 1 illustrates an Internet or World Wide Web ("Web") environment in accordance with the present invention where a prefetching agent cooperates with a Web browser and an optional proxy server of an Internet Service Provider ("ISP")

FIG. 1 illustrates a prefetching agent 100 in accordance with the present invention, that cooperates with a Web browser 110 and a proxy server 120 of an Internet Service Provider ("ISP") to access the Internet or World Wide Web ("Web") environment 130. The proxy server 120 of an Internet Service Provider ("ISP") is optional in this configuration. The prefetching agent 100 may be independent of the browser 110, as shown in FIG. 1, or may be integrated with the browser 110, as would be apparent to a person of ordinary skill. In addition, the prefetching agent 100 may be embodied as a proxy server. Thus, the prefetching agent 100 may be placed on the user's machine, as shown in FIG. 1, or may be placed on an alternate machine. If, for example, the user's machine does not offer adequate memory or processing speed, or is frequently used for resource-intensive computations, the prefetching agent 100 can be installed on an alternate machine. The prefetching agent 100 may perform prefetching for one or more users.

According to a feature of the present invention, the prefetching agent 100 reduces the round trip time to Web resources, as perceived by users. The prefetching agent 100 selects Web pages to be prefetched based on estimated round trip times of Web resources. The estimated round trip time prefetching strategy disclosed herein may be used in combination with the user history-based strategies described above. As discussed further below, the estimated round trip time prefetching strategy disclosed herein generally prefetches those hyperlinks that (i) lead to the largest access speed-up gain when being prefetched and (ii) satisfy some other constraint(s) that prevent excessive network and server overheads and local resource consumption.

Web resources are entities that can be requested from a Web server, including HTML documents, images, audio and video streams and applets. The set of HTML documents and embedded resources that are displayed in the user's browser at a given point of time is referred to herein as the "current document" and the hyperlinks in the current document are referred to as the "embedded hyperlinks." A "current document" may include several HTML pages or frames. The present invention utilizes the hypertext transfer protocol (HTTP) or a similar Internet protocol for accessing hyperlinked documents. The "round trip" time or access time of a resource is the time interval between the sending of the first byte of an HTTP request for the resource until the last byte of the server response has arrived at the requesting Web client. As used herein, the term "client-side" refers to an installation of an agent on a user's machine or a proxy machine.

Determining Estimated Round Trip Time

If the size of the hyperlinked document, s, were known, the estimated round trip time for the HTTP request may be calculated as follows:

$$t_r = t_s + t_w + t_b * s.$$

where the setup time, $t_s$, is the average time for setting up a TCP/IP connection from the prefetching agent 100 to the origin server; the wait time, $t_w$, is the average time between issuing an HTTP request to this server and when the first packet of the response arrives at the prefetching agent 100; the byte transmission time, $t_b$, is the average time for receiving a byte in HTTP responses from the origin server; and resource size, s, is the average size of resources requested from the origin server.

The HTTP request method "HEAD" obtains status information and the size of the resource, s, from the origin server. In one implementation, a HEAD request is used to determine the estimated round trip time of a Web resource. If the HEAD request does not yield any response from the server (due to a network or server error) or if the response shows an error code, then the prefetching agent 100 determines that the hyperlinked document is not accessible. When the user clicks on this hyperlink, the prefetching agent 100 can provide an error message immediately, which significantly reduces the annoying wait for documents that turn out to be inaccessible. If the server responds that the document can be delivered upon request and specifies the document size, s, the prefetching agent 100 computes and then temporarily stores the estimated round trip time for further processing, as described below in conjunction with FIGS. 4A and 4B. If the server responds that the document can be delivered but does not specify the document size, the prefetching agent 100 utilizes the recorded average resource size, s, of the server, as discussed below.

Figure 2:
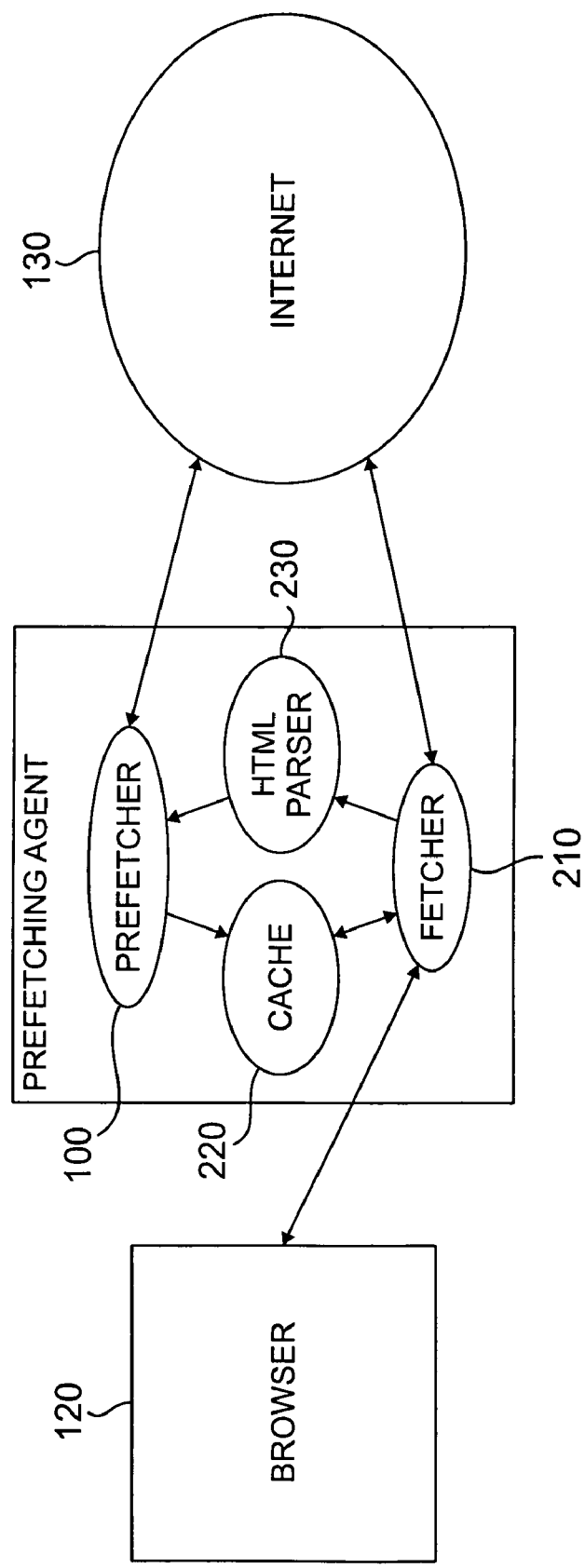
FIG. 2 illustrates the interaction of the prefetching agent, the browser and the Internet of FIG. 1.

FIG. 2 illustrates the interaction of the prefetching agent 100 with the browser 110 and the Internet 130. As shown in FIG. 2, requests for a Web resource from the browser 110 are routed through a fetcher 210. The prefetching agent 100 will inspect the document cache 220 and return the requested resource if the resource is stored in the cache 220. If the requested resource is not stored in the cache 220, the prefetching agent 100 accesses the addressed origin server, fetches the resource, stores the resource in the cache 220, and forwards the resource to the browser 110. Fetching the resource, storing it in the cache, and forwarding it to the browser can be done on a per packet base. In other words, as soon as one packet of the resource has been received by the fetcher 210, the packet can be stored in the agent's cache 220 and simultaneously forwarded to the browser 110. This allows an overlap of receiving packets on the one hand and storing them in the agent cache 220, and forwarding them to the browser 110 on the other hand. This speeds up the operation of the prefetching agent 100.

If the resource is an HTML document, an HTML document parser 230 compiles a list of all embedded hyperlinks in the current document. When the process of loading the requested HTML document and all embedded resources is complete, the prefetching agent 100 activates a prefetching engine, discussed further below in conjunction with FIGS.

4A and 4B, to prefetch a subset of the documents addressed by the embedded hyperlinks. All prefetched documents are placed in the cache 220.

Estimated Round Trip Time-Based Prefetching

The prefetching strategy in accordance with the present invention attempts to select only a few resources for prefetching and aims to ensure that whenever the user clicks on an embedded hyperlink, either the corresponding document has been prefetched or, if not, the document can be fetched very quickly from its origin server. This strategy reduces the Web access time perceived by the user, while also minimizing the network, server and local resource overhead due to prefetching. As previously indicated, the prefetching agent 100 prefetches selected Web pages based on their estimated round trip time. The estimated round trip time is based on the average setup time, $t_s$, for setting up a TCP/IP connection from the prefetching agent 100 to the origin server; the average wait time, $t_w$, between issuing an HTTP request to this server and when the first packet of the response arrives at the prefetching agent 100; the byte transmission time, $t_b$, for receiving a byte in HTTP responses from the origin server; and average or actual resource size, s, of resources requested from the origin server.

Thus, the prefetching agent 100 maintains a server statistics database 300, shown in FIG. 3, that preferably stores a number of statistics for each server that has been previously accessed. The server statistics database 300 maintains a plurality of records, such as records 305–325, each associated with a different origin server. For each server identified in field 340, the server statistics database 300 indicates the average setup time, $t_s$; the average wait time, $t_w$; the average byte transmission time, $t_b$; and average resource size, s, in fields 345 through 360, respectively.

The average resource size, s, is not expected to vary with time. The average setup time, $t_s$, average wait time, $t_w$, and average byte transmission time, $t_b$, however, will vary with time and are preferably linearly weighted averages to adapt computed averages to changing network and server conditions. The more recent a measurement is, the greater the weight it will receive. However, by using a linearly weighted average and not, for example, an exponentially weighted average, the prefetching agent 100 avoids overemphasizing recent measurements that could have been unusually high or low due to the burstiness of Internet traffic. Given a sequence of n measurements $s_1, s_2, \ldots s_n$, where $s_i$ was collected before $s_{i+1}$ for all i between 1 and n−1, the linearly weighted average of $s_1, s_2, \ldots s_n$ is defined as:

$$\frac{1 \cdot s_1}{n(n+1)/2} + \frac{2 \cdot s_2}{n(n+1)/2} + \ldots \frac{n \cdot s_n}{n(n+1)/2}$$

Processes

Figure 4A:
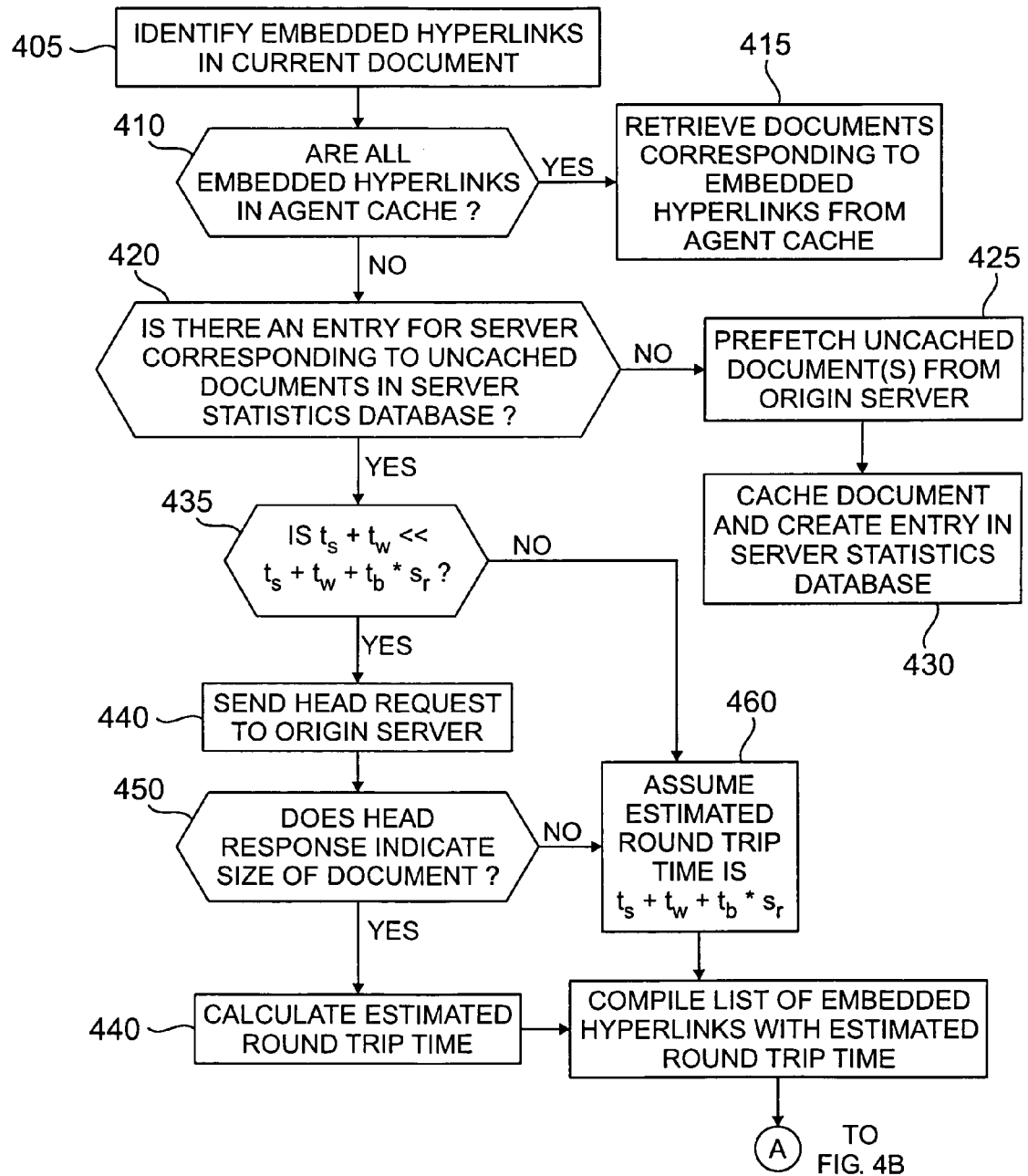
FIGS. 4A and 4B, colectively, are a flow chart describing an exemplary prefetching process implemented by the prefetching agent of FIG. 1.
Figure 4B:
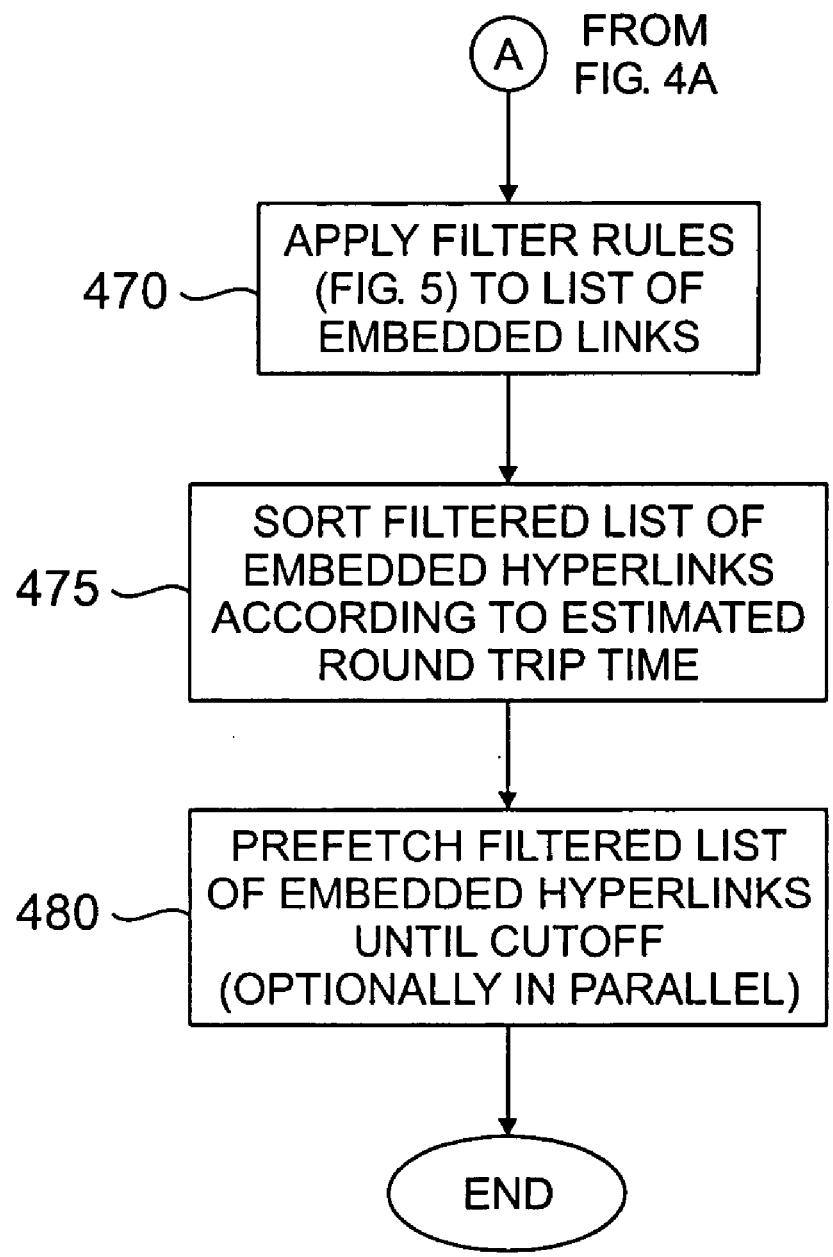

As previously indicated, the prefetching agent 100 activates a prefetching engine, shown in FIGS. 4A and 4B, to prefetch a subset of the documents addressed by the embedded hyperlinks in a current document once the process of loading the current document and all embedded resources is complete. The initiation of the prefetching engine is discussed further below in a section entitled SESSION CONTROL. As shown in FIG. 4A, the prefetching agent initially identifies all embedded hyperlinks in the current document during step 405.

A test is performed during step 410 to determine if all of the embedded hyperlinks are in the agent cache 220. If it is determined during step 410 that all of the embedded hyperlinks are in the cache 220 then, the embedded hyperlinks are retrieved from the agent cache, as necessary, during step 415, and processing continues in a conventional manner. If, however, it is determined during step 410 that all of the embedded hyperlinks are not in the cache 220, a further test is performed during step 420 to determine if there is an entry for the server(s) corresponding to uncached documents in the server statistics database 300.

If it is determined during step 420 that the server statistics database 300 does not contain an entry for one or more server(s) corresponding to uncached documents, then the server associated with the corresponding document has not been accessed before and the prefetching agent 100 has not recorded any access speed measurements for the server. Thus, it is not possible for the prefetching agent 100 to predict the estimated round trip time. The uncached document(s) are prefetched during step 425 and placed in the cache during step 430. In addition, for every accessed server in this step an entry is created in the server statistics database 300 with the observed setup, wait, and byte transmission times, as well as the document length, during step 430.

It is noted that the majority of embedded hyperlinks reference documents on the same server as the current document. Since the prefetching agent 100 has already retrieved the current document, an entry for the origin server already exists in the server statistics database 300. Thus, the number of documents retrieved from servers due to missing entries in the server statistics database 300 is usually small. It is further noted that when the prefetching agent 100 first accesses a server and subsequently records the setup time for this access, this time includes a potentially time-consuming DNS lookup. Later accesses to this server do not involve new DNS lookups due to the DNS caching in the prefetching agent 100.

If, however, it is determined during step 420 that the server statistics database 300 does contain an entry for one or more server(s) corresponding to uncached documents, then a test is performed during step 435 for each one of these servers to determine if the setup and wait times ($t_s$+$t_w$) is significantly smaller than the estimated round trip time ($t_s$+$t_w$+$t_b$*$s_r$). As previously indicated, the HTTP request method HEAD obtains status information and the size of the resource, s, from the origin server. It is noted that responses to HEAD requests are usually very short (generally less than 512 bytes). The estimated round trip time for the HEAD request recognizes that since the response to a HEAD request is usually short, the round trip time is approximately the setup time, $t_s$, plus the wait time, $t_w$. Thus, the test performed during step 435 compares an estimated round trip time for the HEAD request with the average round trip of previous accesses to this server. However, HEADing a document instead of obtaining the entire document right away makes sense only if either the HEAD request has a much shorter round trip time than the GET request or the HEAD request incurs less network byte overhead. Since the size of the document is unknown prior to the HEAD request, the latter cannot be predicted accurately.

Thus, if it is determined during step 435 that the estimated round trip time for the HEAD request is significantly less than the average round trip time of previous accesses to this server, then the prefetching agent 100 sends a HEAD request to the origin server during step 440, so that the estimated round trip time may be computed using the actual size of the requested document. A test is then performed during step 450 to determine if the response to the HEAD request indicates the size, s, of the document. If it is determined during step 450 that the response to the HEAD request does indicate the size, s, of the document, then the estimated round trip time for prefetching the document is calculated during step 455. If the actual size, s, of the hyperlinked document, s, is known, as here, the estimated round trip time for the HTTP request is calculated as follows:

$$t_r = t_s + t_w + t_b * s.$$

If, however, it is determined during step 435 that the estimated round trip time for the HEAD request is not significantly less than the average round trip time of previous accesses to this server, or if it is determined during step 450 that the response to the HEAD request does not indicate the size, s, of the document, then the estimated round trip time for the document is approximated during step 460 using the average resource size, $s_r$, as follows:

$$t_r = t_s + t_w + t_b * s_r.$$

Figure 5:
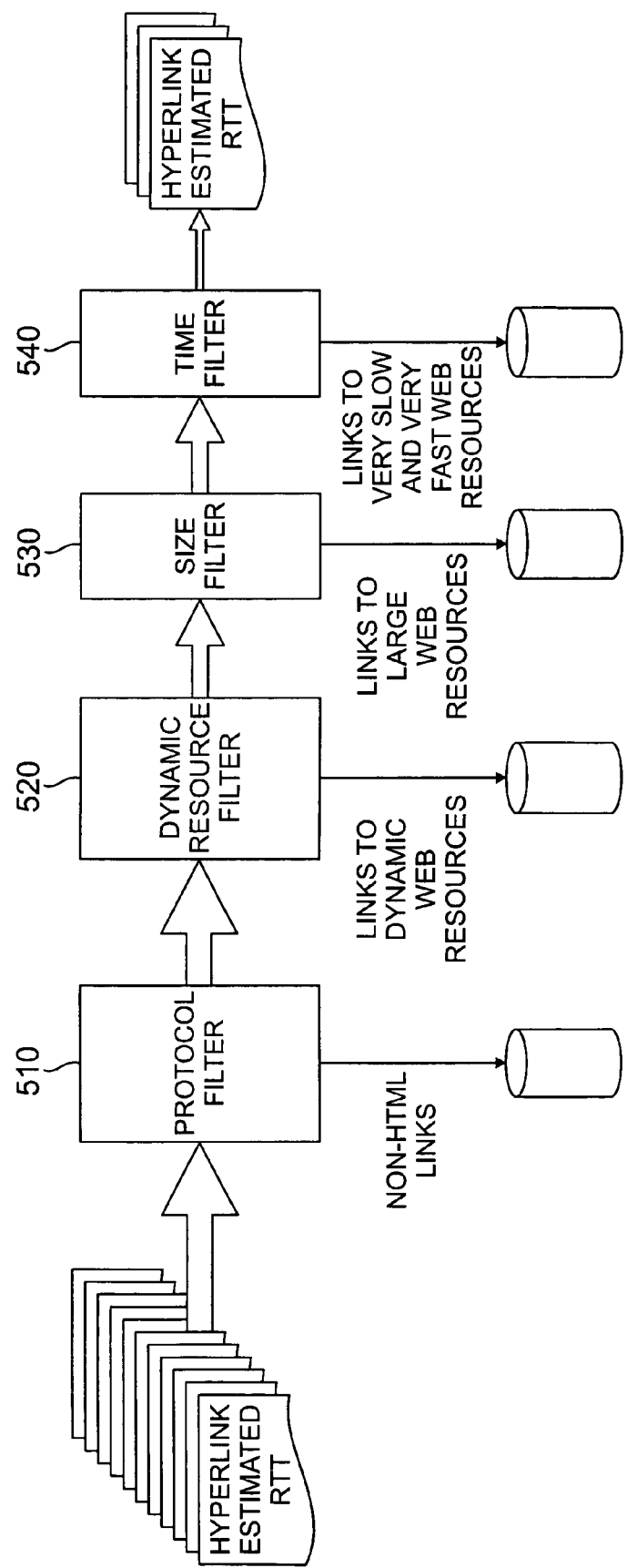
FIG. 5 illustrates a number of filters that may optionally be applied to the list of documents to be prefetched to minimize the overhead on network, server and local resources.

Once the estimated round trip time has been calculated (step 455) or approximated (step 460), the prefetching agent 100 will compile a list of the embedded hyperlinks during step 465 with the corresponding estimated round trip time. In one preferred implementation, a filter, discussed below in conjunction with FIG. 5, is then applied to the compiled list of embedded hyperlinks during step 470 (FIG. 4B) to reduce the additional overhead on server, network and local resources.

The filtered list of embedded hyperlinks is then sorted during step 475 according to estimated round trip times (longest to shortest). The prefetching agent 100 begins prefetching the documents in the sorted filtered list of embedded hyperlinks during step 480, starting with the document(s) having the highest estimated round trip times, until a cutoff event occurs. Thereafter, program control terminates. It is noted that cutoff events, such as a user requesting a new document, are discussed further below in a section entitled SESSION CONTROL. In addition, once all the documents in the sorted filtered list have been prefetched, the prefetching agent 100 may apply the entire prefetching strategy to the Web resources embedded in the prefetched documents.

It is further noted that the prefetching of documents may optionally be performed in parallel. In one embodiment, six (6) threads start prefetching the documents in the sorted filtered list of embedded hyperlinks. Since documents are being prefetched in parallel by multiple threads, it is possible that while a resource is in transit from the server to the prefetching agent 100, it may be requested a second time by another thread in the prefetching agent 100, for example, if the same hyperlink appears multiple times in the current document. To prevent the transmission of the same resource multiple times from the server, the prefetching agent 100 announces the beginning and the end of a resource transmission to the cache 220. Before a thread of the prefetching agent 100 requests a resource from a server, it checks whether this resource is already cached or in transit. In the latter case, the thread waits for the end of the transmission and then picks up the resource from the cache 220.

Filtering of Embedded Hyperlink List

As previously indicated, the prefetching agent 100 applies a filter to the compiled list of embedded hyperlinks to reduce the additional overhead on server, network and local resources. In this manner, the prefetching agent 100 reduces the Web access time perceived by the user, while also minimizing the network and local resource overhead due to prefetching.

As discussed above in conjunction with FIGS. 4A and 4B, the prefetching agent 100 compiles the set of embedded hyperlinks with associated estimates for the round trip times for the referenced documents. This set of hyperlinks can potentially be large. In order to comply with the design goals of providing accelerated Web access with minimum additional utilization of network, server and local resources, the prefetching agent 100 applies several rules, shown in FIG. 5, to decrease the size of the list of hyperlinks before prefetching the referenced documents. It is noted that the filter set 510, 520, 530, 540 shown in FIG. 5, is merely illustrative of the principles of the present invention, and only one or more of such filters 510, 520, 530, 540, or an alternate filter set, could be applied to reduce the additional overhead on server, network and local resources, as would be apparent to a person of ordinary skill in the art.

As shown in FIG. 5, the prefetching agent 100 initially applies a filter 510 to discard all hyperlinks from the list of embedded hyperlinks that do not use the HTTP protocol for transmission. The types of Web resources referenced by these hyperlinks often cannot be displayed in a browser but are instead downloadable executables, compressed non-HTML documents or images. The decision to fetch these potentially large files should only be made by the user.

In addition, the prefetching agent 100 applies a filter 520 to discard all hyperlinks from the list of embedded hyperlinks corresponding to dynamically generated Web resources, such as the output of cgi scripts. Filter 520 aims to reduce the load on servers due to prefetching. Dynamically generated documents would incur additional processing overhead on the server that the prefetching agent 100 wants to avoid. Since there are no naming conventions for dynamic and static Web pages, the prefetching agent 100 uses a heuristic in order to determine which hyperlinks point to dynamic Web resources.

The heuristic employed by the prefetching agent to determine whether a resource is probably static or dynamic is as follows. If the URL for the resource contains a "?", it is highly likely that the resource is dynamically generated because the "?" usually serves as a separator in a URL between the name of a program to be executed on the Web server and the input data for the program. If a "?" is not present in the URL, the prefetching agent checks the URL for the occurrence of a ".". If no "." is present, the URL very likely is the name of a directory on the Web server, where the directory contains an HTML file with a standard name such as "index.html" that will be automatically selected by the server if the URL contains only the name of the directory. If the URL contains a "." and no "?", the prefetching agent checks whether the URL ends with ".htm", "html", ".jpg", "jpeg", ".gif", ".txt", ".text", or "map", where no distinction is being made between upper and lower case letters. In all these cases, it is likely that the URL designates a static resource. As the use of endings for resources gradually changes, this list of endings can be modified accordingly.

The prefetching agent 100 applies a filter 530 to discard all hyperlinks from the list of embedded hyperlinks corresponding to documents whose size is more than a certain maximum size threshold, and a filter 540 to discard all documents whose estimated round trip time is longer than a certain maximum time or shorter than a certain minimum time threshold, discussed below. The prefetching agent 100 avoids the network overhead incurred by very large documents that are later not requested by users. Documents that take a very long time to prefetch are being sacrificed in favor of faster loading documents so that the prefetching will not be stalled by a few documents. More important, though, and leading to more hyperlinks being weeded out by the prefetching agent 100, is the filter 530 that discards all documents whose estimated round trip time is shorter than a certain minimum time threshold. These documents are considered fast enough by the prefetching agent 100 to not warrant prefetching.

The prefetching agent 100 determines the lower time threshold by default in a dynamic way. At any given point in time, the minimum time threshold is, for example, 70% of the linearly weighted average of all previous Web accesses. In other words, every resource with an estimated round trip time that is slower than 70% of the weighted average access time of all previously requested Web resources will be prefetched, provided that the resource fulfills other requirements indicated above. The threshold of 70% has been selected based on experimental results and a balancing of access speed-ups and network byte overheads. In this manner, the estimated round trip times that are fast enough to not require prefetching varies over time and depends on the set of previously accessed Web sites. This rule ensures that the prefetching agent 100 will not simply start prefetching every embedded hyperlink from slow sites, as could occur with a fixed minimum time threshold. Similarly, if the user accesses fast sites, the prefetching agent 100 will not simply stop prefetching altogether just because a fixed minimum time threshold is always higher than the estimated round trip time for documents. As an additional rule, the prefetching agent 100 will prefetch a resource whenever its estimated round trip time exceeds 3000 ms (and fulfills the other requirements discussed above), independent of the lower time threshold. This additional rule guarantees that the resources with the highest round trip times from slow sites may be prefetched even if the average past access time was very high. In other words, the minimum time threshold is prevented from exceeding 3000 ms. A value of 3000 ms was selected based on an approximation of the maximum amount of time that a moderately impatient Web user would want to wait for an HTML document.

Session Control

As previously indicated, to achieve an appropriate balance of reducing the Web access time perceived by the user, while also minimizing the network, server and local resource overhead due to prefetching, the prefetching agent 100 must determine when to start and stop prefetching. The user should not be penalized for accessing the Web using the prefetching agent 100. Practically speaking, this means that the prefetching agent 100 should preempt the prefetching activity once the user requests that a document should be fetched. The prefetching agent 100 should then retrieve the requested document either from its cache or from the origin server. When the retrieval is completed, the prefetching agent 100 may resume the prefetching immediately and should prefetch embedded hyperlinks from the new current document. If fetching the user-requested document and its embedded resources turns out to be very slow, the prefetching agent 100 should start prefetching embedded hyperlinks before the fetching activity has completed but in such a way that the current transfer of resources does not slow down.

Starting prefetching as early as possible can speed up later hyperlink accesses considerably. On the other hand, the prefetching agent 100 should not activate its prefetching engine while fetching user-requested resources proceeds at a reasonably high speed. This avoids the risk of decreasing the bandwidth for user-requested-resources and thus penalizing the user for accessing the Web using the prefetching agent 100. If the user revisits a Web page, the prefetching agent 100 should not repeat the somewhat costly prediction of round trip times that it previously completed for the hyperlinks in that page. It should rather resume the estimation of round trip times or the prefetching where it left off.

The prefetching agent 100 needs to determine the point in time when the fetching of resources is completed or when the fetching has become slow enough to allow the resumption of prefetching. The prefetching agent 100 also needs to know when the user issues a new request for a Web page so that the prefetching agent 100 can immediately suspend the prefetching activity, in favor of fetching the new requested page. There are no provisions in the HTTP protocol, however, that allow a Web client or server to announce the beginning and the end of a session or to notify proxies of the currently experienced quality of service such as the "slowness" of Web resource retrieval.

Ideally, the prefetching agent 100 would like to see a notification from the browser whenever the user requests a new document, indicating the beginning of a session. After every connection that had been set up for receiving embedded resources of this document has been shut down, known as the end of the session, the prefetching agent 100 would like to see a second notification. In addition, the prefetching agent 100 would also like to receive a message when the data transfer rate during resource retrievals has fallen below a certain threshold. In the absence of these notifications, the prefetching agent 100 can use several techniques and heuristics to determine the beginning and the end of a session and the activity levels between server and browser throughout the session. The term "Web page" is used for the set of Web resources requested during a session. The access time for a Web page is the time between beginning and end of the session.

When the prefetching agent 100 receives the first request, no other user-requested document is in transit or has been loaded. Therefore, this can safely be considered the beginning of a new session. The prefetching agent 100 parses the document returned by the server and compiles a list of references for HTML frames and embedded resources as well as embedded hyperlinks for HTML documents. Whenever the prefetching agent 100 receives a browser request after the first request, it searches the list of frame and embedded resource references. If the requested URL is in the list or contains certain telltale signs of an embedded resource name (e.g., if the URL ends with .jpg), the prefetching agent 100 considers the request as belonging to the ongoing session.

If the prefetching agent 100 decides that a request marks the beginning of a new session and there are still documents from the ongoing session in transit from the server to the prefetching agent 100, the prefetching agent 100 will not shut down the open connections to the server immediately. It will allow a grace period before shutting them down if they transmit data at a certain minimum data rate, in case the heuristic used by the prefetching agent 100 to detect the end of a session led to an erroneous decision and assuming that a high data rate over a connection will end the transmission soon anyway.

Another related problem is that a browser will not notify the prefetching agent 100 when the user manually stops the transmission of data from a server, due to the fact that HTTP has no notion of a session. Therefore, the prefetching agent 100 might continue fetching data that the user does not need or want any more. When the user then requests a new document, the prefetching agent 100 may still fetch data from a server. Due to the grace period granted to open connections before closing them, the prefetching agent 100 might respond to the new user request in a somewhat sluggish way. Here, the goal of not penalizing the user for accessing the Web through the prefetching agent 100 is sacrificed in favor of increasing the probability of functional correctness. The prefetching agent 100 may still exhibit incorrect behavior if all of its heuristics fail and it closes open connections erroneously. In this case, the user has to rerequest the new current document, which will bypass the agent's session control and prefetching mechanism and correctly load the desired document.

The prefetching agent 100 stops prefetching whenever a new session begins. It restarts prefetching with a new current document a short time, for example, 500 ms, after all browser requests have been completed. This time marks the assumed end of a session. The short delay between the completion of all browser requests and the resumption of prefetching helps correcting an erroneous end-of-session decision. If, during this short time interval, a new request from the browser is received, the prefetching agent 100 will reconsider its end-of-session decision based on the URL in the new request. The request could indicate either that the current session is still in progress or that a new session has begun. A value of 500 ms turned out to be long enough to wait for "straggler" requests from a browser even if the browser and the prefetching agent 100 reside on different machines on a LAN. On the other hand, 500 ms is still so short that prefetching resumes almost immediately after the end of a session.

The prefetching agent 100 can also start prefetching before the end of the current session if the combined activity of all open connections to servers falls below a certain threshold. The activity is measured as a linear combination of the number of requests received by the prefetching agent 100 and the data transfer rate during the last unit of time. In the absence of reliable and low-overhead techniques for estimating the bandwidth between the prefetching agent 100 and a server, the prefetching agent 100 assumes that the bandwidth is fully utilized by the currently open connections to the server if the activity level between the prefetching agent 100 and the server exceeds the threshold mentioned above. In this case, no prefetching will take place before the end of the current session.

A browser that interacts with the Web through the prefetching agent 100 should operate with its cache turned off. Otherwise, the browser's cache will intercept requests for previously cached documents and not convey the change of the current document to the prefetching agent 100. The prefetching agent 100 might continue to unnecessarily prefetch documents that were referenced by a previous current document and not resume the prefetching based on the new current document.

Configurability

The user may change several parameters that dictate the aggressiveness of the prefetching strategy employed by the prefetching agent 100:

(1) minimum and maximum size thresholds for Web resources that will be prefetched;
(2) minimum and maximum thresholds for estimated round trip times for resources that will be prefetched;
(3) dynamic or fixed user-specified threshold for the minimum estimated round trip time that qualifies a resource for prefetching;
(4) time span between the completion of all browser requests in a given session and the resumption of prefetching (values in the millisecond to tens of seconds range make sense for different user preferences);
(5) maximum number of hyperlinks on an HTML page that can qualify for prefetching;
(6) prefetching of embedded resources or not; and
(7) number of prefetching threads.

It is to be understood that the embodiments and variations shown and described herein are merely illustrative of the principles of this invention and that various modifications may be implemented by those skilled in the art without departing from the scope and spirit of the invention.

I claim:

1. A method of prefetching one or more Internet resources referenced in one or more Web pages, said method comprising the steps of:

obtaining one or more estimated round trip times for said Internet resources, wherein said one or more estimated round trip times are based on an interval of time between a sending of an HTTP request and a receipt of a response to said HTTP request; and prefetching said Internet resources based on a descending order of said one or more estimated round trip times.

2. The method according to claim 1, wherein two or more of said Internet resources are prefetched substantially in parallel.

3. The method according to claim 1, wherein said step of prefetching said Internet resources based on said one or more estimated round trip times is performed only for Internet resources associated with origin servers that have been previously accessed and said method further comprising the step of prefetching all Internet resources associated with servers that have not been previously accessed.

4. The method according to claim 1, wherein said one or more estimated round trip times for each Internet resource is based on average access time statistics for the corresponding origin server and the actual size of said Internet resource when said actual size is available.

5. The method according to claim 4, wherein said one or more estimated round trip times for each Internet resource is based on average access time statistics for the corresponding origin server and the average size of Internet resources provided by said origin server if said origin server does not indicate said actual size.

6. The method according to claim 4, wherein said one or more estimated round trip times for each Internet resource is based on average access time statistics for the corresponding origin server and the average size of Internet resources provided by said origin server if the setup and wait time for accessing said origin server is not significantly less than the average round trip time for Internet resources obtained from said origin server.

7. The method according to claim 1, wherein said one or more estimated round trip times are based on at least one actual prior round trip time for said Internet resource.

8. The method according to claim 1, wherein said step of prefetching said Internet resources does not begin until said one or more Web pages have been fetched.

9. The method according to claim 1, wherein said step of prefetching said Internet resources continues until said Internet resources have been prefetched or until a user selects a new Web page.

10. The method according to claim 1, further comprising the steps of storing said Internet resources in a cache and determining if any of said Internet resources are already stored in said cache before prefetching begins.

11. The method according to claim 1, further comprising the step of applying a filter to said Internet resources to reduce the overhead on network, server or local resources due to prefetching.

12. The method according to claim 11, wherein said filter discards all Internet resources that do not use the HTTP protocol for transmission.

13. The method according to claim 11, wherein said filter discards all Internet resources that corresponding to dynamically generated Web resources.

14. The method according to claim 11, wherein said filter discards all Internet resources that correspond to resources whose size is more than a certain maximum size threshold.

15. The method according to claim 11, wherein said filter discards all Internet resources that correspond to resources whose estimated round trip time is longer than a certain maximum time.

16. The method according to claim 11, wherein said filter discards all Internet resources that correspond to resources whose estimated round trip time is shorter than a certain minimum time threshold.

17. A method of prefetching one or more Internet resources referenced in one or more Web pages, said method comprising the steps of:
   determining one or more estimated round trip times for said Internet resources based on an interval of time between a sending of an HTTP request and a receipt of a response to said HTTP request;
   sorting a list of said Internet resources based on a descending order of said one or more estimated round trip times;
   prefetching said sorted list of Internet resources until one or more predefined threshold conditions are met.

18. The method according to claim 17, wherein two or more of said Internet resources are prefetched substantially in parallel.

19. The method according to claim 17, wherein said step of prefetching said Internet resources based on said descending order of said one or more estimated round trip times is performed only for resources associated with origin servers that have been previously accessed and said method further comprising the step of prefetching all resources associated with servers that have not been previously accessed.

20. The method according to claim 17, wherein said one or more estimated round trip times for each Internet resource is based on average access time statistics for the corresponding origin server and the actual size of said Internet resource when said actual size is available.

21. The method according to claim 20, wherein said one or more estimated round trip times for each Internet resource is based on average access time statistics for the corresponding origin server and the average size of Internet resources provided by said origin server if said origin server does not indicate said actual size.

22. The method according to claim 20, wherein said one or more estimated round trip times for each Internet resource is based on average access time statistics for the corresponding origin server and the average size of Internet resources provided by said origin server if the setup and wait time for accessing said origin server is not significantly less than the average round trip time for Internet resources obtained from said origin server.

23. The method according to claim 20, further comprising the step of applying a filter to said Interent resources to reduce the overhead on network, server or local resources due to prefetching.

24. The method according to claim 23, wherein said filter discards all Internet resources selected from the set comprised substantially of those Internet resources that (i) do not use the HTTP protocol for transmission; (ii) correspond to dynamically generated Web resources; (iii) correspond to resources whose size is more than a certain maximum size threshold, (iv) correspond to resources whose estimated round trip time is longer than a certain maximum time, or (v) correspond to resources whose estimated round trip time is shorter than a certain minimum time threshold.

25. A system for prefetching one or more Internet resources referenced in one or more Web pages, each of said Internet resources having an associated origin server, said tool comprising:
   a memory for storing a server statistics database that records access time statistics for each origin server that has been previously accessed;
   a processor operatively coupled to said memory, said processor configured to:
   obtain one or more estimated round trip times for said Internet resources, wherein said one or more estimated round trip times are based on an interval of time between a sending of an HTTP request and a receipt of a response to said HTTP request; and
   prefetch said Internet resources based on a descending order of said one or more estimated round trip times.

26. The system according to claim 25, wherein said server statistics database records the average setup, wait and byte transmission times and average resource size for said Internet resources obtained from said corresponding origin server.

27. A method of prefetching one or more Internet resources referenced in one or more Web pages, said method comprising the steps of:
   determining if one or more of said Internet resources are candidates for prefetching based on one or more estimated round trip times, wherein said one or more estimated round trip times are based on an interval of time between a sending of an HTTP request and a receipt of a response to said HTTP request; and
   prefetching said Internet resources that are determined to be candidates for prefetching according to a descending order of said one or more estimated round trip times.

28. An article of manufacture for prefetching one or more Internet resources referenced in one or more Web pages, said article of manufacture comprising:
   a computer readable medium having computer readable program code means embodied thereon, said computer readable program code means comprising program code means for causing a computer to:
   obtain one or more estimated round trip times for said Internet resources, wherein said one or more estimated round trip times are based on an interval of time between a sending of an HTTP request and a receipt of a response to said HTTP request; and
   prefetch said Internet resources based on a descending order of said one or more estimated round trip times.

29. A method of prefetching one or more Internet resources referenced in one or more Web pages, said method comprising the steps of:

obtaining one or more estimated round trip times for said Internet resources, wherein said one or more estimated round trip times are based on an interval of time between a sending of an HTTP request and a receipt of a response to said HTTP request;

identifying a subset of said Internet resources that are candidates for prefetching based on said one or more estimated round trip times; and determining whether to prefetch one or more of said Internet resources in said subset of Internet resources based on predefined conditions, at least one of said predefined conditions being based on a descending order said one or more estimated round trip times.

* * * * *